US010038972B1

(12) United States Patent
Feng et al.

(10) Patent No.: US 10,038,972 B1
(45) Date of Patent: Jul. 31, 2018

(54) MONITORING OUTDOOR AND INDOOR REGIONS WITH MOBILE DEVICES

(71) Applicant: Phunware, Inc., Austin, TX (US)

(72) Inventors: Quan Feng, Austin, TX (US); Jason Schmitt, Austin, TX (US); Hua Luo, Austin, TX (US); Narayan Iyer, Austin, TX (US); Paresh Suthar, Austin, TX (US); Matthew Lindenberger, Cedar Park, TX (US)

(73) Assignee: Phunware, Inc., Austin, TX (US)

( * ) Notice: Subject to any disclaimer, the term of this patent is extended or adjusted under 35 U.S.C. 154(b) by 0 days.

(21) Appl. No.: 14/968,240

(22) Filed: Dec. 14, 2015

Related U.S. Application Data

(60) Provisional application No. 62/091,120, filed on Dec. 12, 2014.

(51) Int. Cl.
*H04W 4/021* (2018.01)
*H04W 4/02* (2018.01)

(52) U.S. Cl.
CPC ........... *H04W 4/021* (2013.01); *H04W 4/023* (2013.01)

(58) Field of Classification Search
CPC . H04W 4/008; H04W 4/043; H04W 36/0083; H04W 4/025; H04W 4/02; H04W 4/023; H04W 4/021; H04W 64/00; H04W 84/12; H04W 16/18; H04W 48/16; H04W 88/00; H04W 88/02; H04W 4/027; H04W 4/028; H04W 64/006; H04W 24/02; H04W 36/007; H04W 72/005; H04W 72/046; H04W 76/02; H04W 84/045; H04W 36/00; H04W 40/36; H04W 48/18; H04W 4/04; H04W 56/0015; H04W 64/003; G01C 21/20; G01C 21/206; G01C 21/00; G01C 21/16; G01C 21/3685; H04L 67/12; H04L 2012/2841
See application file for complete search history.

(56) References Cited

U.S. PATENT DOCUMENTS

| 2013/0045760 | A1* | 2/2013 | Obermeyer | G08B 21/0277 455/456.6 |
|---|---|---|---|---|
| 2013/0310080 | A1* | 11/2013 | Palanki | G01S 5/0236 455/456.3 |
| 2016/0080911 | A1* | 3/2016 | Kay | H04W 4/04 455/456.1 |

\* cited by examiner

*Primary Examiner* — Christopher M Brandt
*Assistant Examiner* — Jing Gao
(74) *Attorney, Agent, or Firm* — Wilson Sonsini Goodrich & Rosati

(57) ABSTRACT

Methods and systems are provided for allocating monitoring resources of a mobile device based on information received at the mobile device. A plurality of outdoor regions and a plurality of indoor regions associated with a geographic area may be stored on the mobile device. Additionally, a determination may be made whether the mobile device is outside of each of the plurality of outdoor regions. Additionally, monitoring resources of the mobile device may be allocated in a first mode or a second mode based on the determination whether the mobile device is outside of each of the plurality of outdoor regions.

22 Claims, 4 Drawing Sheets

MONITORING OUTDOOR AND INDOOR REGIONS WITH MOBILE DEVICES

CROSS-REFERENCE

This application claims priority to U.S. Provisional Patent Application No. 62/091,120, filed Dec. 12, 2014, which is entirely incorporated herein by reference.

BACKGROUND

The prevalence of electronic devices and mobile applications allows people to engage with a variety of digital data and online services. As mobile applications become increasingly utilized by users in their daily activities, it is becoming beneficial to utilize location-based customization to personalize users' experiences. In particular, it is beneficial to monitor location-based information associated with outdoor regions as well as indoor regions that may provide useful information to a user, particularly when the user is utilizing a mobile application.

Several methodologies have been developed to determine the position of a mobile communications device. For example, the position of a device may be determined based on triangulation of nearby cell towers and based on properties of the connection the device has with each of these towers. However, such methods may yield inaccurate results under certain circumstances such as, for example, when there is insufficient cell tower density to provide precise resolution (e.g., meter-level resolution) of the device's position. Wi-Fi triangulation may also be utilized to determine the position of a mobile communications device. This approach is analogous to cell tower triangulation, but uses Wi-Fi hot spots near the device to determine its position. However, the applicability of this technique may be limited when, for example, the set of known Wi-Fi hot spots in a region is not sufficiently large. The Global Positioning System (GPS) may also be used to determine the position of a mobile communications device. GPS involves a constellation of satellites that broadcast data, allowing the device to determine its location using a triangulation calculation. However, GPS methodologies may have certain drawbacks. For example, GPS signals may not be sufficiently strong in certain locations. Furthermore, receiving and processing GPS position updates on an ongoing basis is typically battery intensive for mobile communications devices. Accordingly, mobile devices may process position data from different types of location providers.

SUMMARY

While a mobile operating system (OS) allows a device to monitor location-based information associated with outdoor regions as well as indoor regions, the OS may limit the number of resources that are utilized to monitor location-based information. For example, the total outdoor regions and indoor regions that an application wants to monitor may outnumber the maximum number of regions that may be monitored by the OS. Additionally, an application running on a mobile device may prefer to monitor different regions based on the position of the user.

As such, it may be beneficial for an application operating on a mobile device to allocate the monitoring resources of a mobile device based on the location of a user (as assessed by the position of the user's mobile device). In addition, it may be beneficial for an application operating on a mobile device to enable the seamless transition from indoor maps to outdoor maps, and vice versa, based on the location of the user.

For example, if a user is outside any outdoor region, it may be beneficial to preferentially allocate monitoring resources of the mobile device to monitor outdoor regions within a threshold distance of the user. In another example however, if a user is within an outdoor region, it may be beneficial to preferentially allocate monitoring resources to monitor indoor regions within the outdoor region rather than monitoring other outdoor regions besides that outdoor region where that user is within. Accordingly, the present disclosure provides methods and systems for allocating monitoring resources of a mobile device based on information received at the mobile device.

An aspect of the invention provides a computer-implemented method for allocating monitoring resources of a mobile device based on information received at the mobile device. The method comprises receiving, over a network, a plurality of outdoor regions and a plurality of indoor regions associated with a geographic area at the mobile device. Additionally, the method comprises determining, using a computer processor, whether the mobile device is outside of each of the plurality of outdoor regions. The method also comprises allocating the monitoring resources of the mobile device in a first mode when it is determined that the mobile device is outside each of the plurality of outdoor regions, wherein the first mode of allocating the monitoring resources of the mobile device comprises monitoring a geographic location of the mobile device with respect to at least a subset of the plurality of outdoor regions. Additionally, the method comprises allocating the monitoring resources of the mobile device in a second mode when it is determined that the mobile device is within a given outdoor region among the plurality of outdoor regions, wherein the given outdoor region has at least one indoor region among the plurality of indoor regions, wherein the second mode of allocating the monitoring resources of the mobile device comprises monitoring a geographic location of the mobile device in the given outdoor region with respect to the at least one indoor region.

Another aspect of the invention provides a computer-implemented method for switching between a first mode of allocating monitoring resources of a mobile device and a second mode of allocating monitoring resources of the mobile device based on information received at the mobile device. The method comprises receiving, over a network, a plurality of outdoor regions and a plurality of indoor regions associated with a geographic area at the mobile device. The method also comprises determining, using a computer processor, a proximity of the mobile device to each outdoor region of the plurality of outdoor regions. Additionally, the method comprises based on the proximity determined, determining that the mobile device is outside each of the plurality of outdoor regions. The method also comprises allocating the monitoring resources of the mobile device in a first mode based on the determination that the mobile device is outside each of the plurality of outdoor regions, wherein the first mode of allocating the monitoring resources of the mobile device comprises monitoring a geographic location of the mobile device with respect to at least a subset of the plurality of outdoor regions. The method also comprises reassessing the proximity of the mobile device to each outdoor region of the plurality of outdoor regions. Additionally, the method comprises determining that the mobile device is within a given outdoor region of the plurality of outdoor regions. The method also comprises allocating the monitoring resources of the mobile device in a second mode based on the determination that the mobile device is within the given outdoor region of the plurality of outdoor regions, wherein the given outdoor region has at least one indoor region among the plurality of indoor regions, wherein the second mode of allocating the monitoring resources of the mobile device comprises monitoring a geographic location of the mobile device in the given outdoor region with respect to the at least one indoor region.

Another aspect of the present disclosure provides a non-transitory medium comprising machine-executable code that, upon execution by one or more computer processors, implements any of the methods above or elsewhere herein.

Another aspect of the present disclosure provides a computer system comprising one or more computer processors and computer memory coupled thereto. The computer memory comprises machine-executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
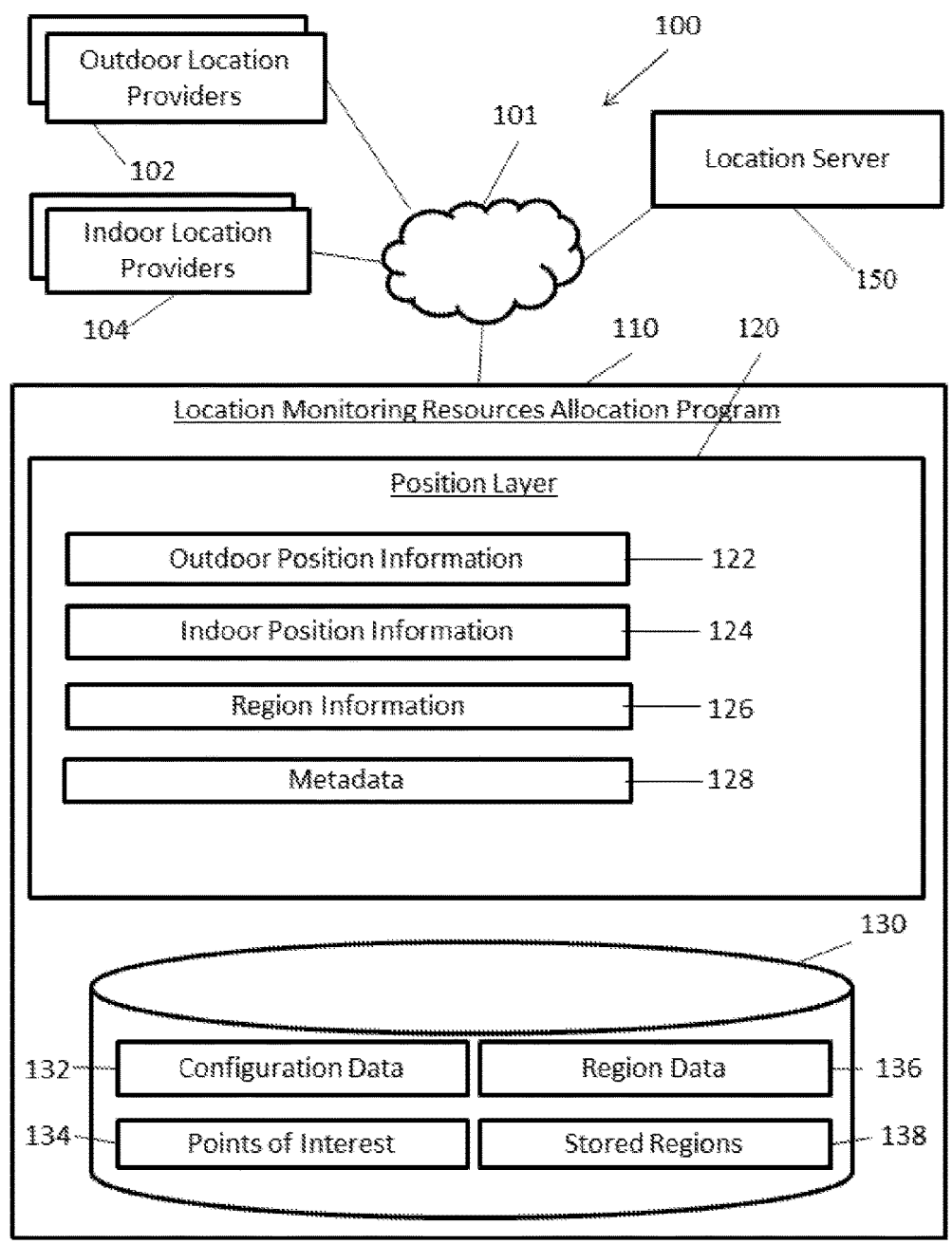
FIG. 1 illustrates example components of a location monitoring resource allocation system that may be used in some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, a "beacon" generally refers to the location of a Bluetooth Low Energy (BLE) technology or some other provider of indoor location services. For example, one or more Bluetooth devices that emit radio signals may be pre-installed at various locations inside a building. As a mobile device enters the building and moves around, it receives the Bluetooth signals and uses the relative signal strength to calculate approximate distances to the Bluetooth devices. Typically a beacon device is identified with a Universally Unique ID called "Proximity UUID" and a pair of integers called "major" and "minor" numbers.

As used herein, an "aggregated beacon" refers to a region specified by a beacon Proximity UUID but without major and minor numbers. For example, if a geo-region contains beacons with three distinct proximity UUIDs, each of the UUIDs defines an aggregated beacon region as defined herein.

As used herein, an "indoor region" generally refers to the area surrounding one or more beacons. An OS typically uses the beacons within an indoor region to implement a region monitoring service which generally covers indoor regions. Additionally, as used herein, an "outdoor region" generally refers to a geo-region. A geo-region is a circular area on earth, with a pair of latitude and longitude coordinates for the central location and a radius for the circle. Additionally, an outdoor region may also refer to an aggregation of beacons. An OS typically uses the cellular networks and Global Positioning Service (GPS) to implement the region monitoring service which generally covers geo-regions. Additionally, a geo-region is able to cover the beacon regions that are installed inside a building. As such, an indoor region (e.g. beacon region or plurality of beacon regions) is able to be associated with (e.g. contained within) an outdoor region (e.g. geo-region).

The present disclosure provides methods and systems for allocating location monitoring resources of a mobile device based on information received at the mobile device. In some embodiments, an application on a mobile device is pre-loaded with outdoor regions and indoor regions that the application wants to monitor in a large area of interest. Additionally, position information from multiple location providers is received at the mobile device for estimating the position of the mobile device. Based on the position information, a determination is made as to whether the mobile device is within an outdoor region that is pre-loaded to the application. If the mobile device is not within an outdoor region, the location monitoring resources of the mobile device are allocated in a first mode which preferentially monitors surrounding outdoor regions. However, if a determination is made that the mobile device is within a given outdoor region stored in the application, the location monitoring resources of the mobile device are allocated in a second mode which preferentially monitors the given outdoor region, and also preferentially monitors indoor regions within the given outdoor region.

Examples of mobile devices may include laptops, tablet computing devices, smart phones, cellular phones, and the like. Location monitoring resources include the limited capabilities that an OS provides to determine the position of the mobile device and the geographical location (e.g., global, regional, city-wide, or neighborhood) of regions that are of interest. Further, as used herein, determination of a mobile device's position includes affirmative determinations as well as estimations that may have varying degrees of certainty. Furthermore, the estimated position may include any type of information that indicates the device's position or trajectory. The estimated position may include an estimate of the position alone, or it may include other information indicating a trajectory. As used herein, trajectory information encompasses any information that indicates the device's trajectory including, but not limited to, heading, speed, velocity, acceleration, estimated path, or any other information indicative of the device's future position. Furthermore, as used herein, regions may refer to one-, two-, or three-dimensional regions. For example, a region may include a two-dimensional area, a particular floor or other vertical space within that area, a line, a boundary, a point, or any other spatial region. In some examples, one or more regions may overlap each other to some degree. In some examples, a portion of a first region may overlap a second region. In some examples, a first region may overlap an entire second region.

FIG. 1 illustrates example components of a location monitoring resource allocation system that may be used in some embodiments of the present disclosure. System 100 includes network 101, outdoor location providers 102, indoor location providers 104, location monitoring resource allocation application 110, and location server 150.

Network 101 represents one or more computer networks or other types of communications networks that facilitate communication between the components of system 100. Though illustrated as a single network, network 101 may include any number of separate networks that are interconnected directly or indirectly. Network 101 may have any structure, configuration, or function described below with respect to network 430.

Outdoor location providers 102 include any system, service, device, network, or other component that provides outdoor region position information to location monitoring resource allocation program 110. In particular, the outdoor location provider 102 provides position information regarding the position of a mobile device with respect to positions of outdoor regions. The outdoor position information 122 may be provided from one or more outdoor location providers 102 to a position layer 120 of location monitoring resource allocation program 110. Some embodiments include one or more outdoor location providers 102. Identification of certain location providers as "outdoor" location providers is for convenience purposes only, and such providers may include systems or components that are not physically located outside, and such providers may estimate the mobile device's position regardless of whether the mobile device is actually located outside. Furthermore, outdoor location providers 102 are illustrated as remote from location monitoring resource allocation application 110 for convenience purposes only, and such providers may be remote from the device running location monitoring resource allocation program 110 or local to such device. For example, outdoor location providers 102 may be "network-based" (wherein the position is estimated based on one or more signals provided by one or more components of a network) or "device-based" (where the mobile device estimates its position based on its own sensor-readings). Some outdoor location providers may also be a hybrid of these approaches (e.g., a provider may base its position estimate on signals measured by both the device and one or more network elements). In some embodiments, signals may be received at one location and then communicated to and processed by a device at another location.

Outdoor location providers may use any suitable system including, but not limited to, the Global Positioning System ("GPS"), the Global Navigation Satellite System ("GLONASS"), or cell tower triangulation, though such technologies are not required. Certain embodiments may utilize any suitable technology to facilitate the determination of the device's position relative to outdoor regions. Furthermore, outdoor location providers 102 may express the position using any suitable data model with any suitable format and information, and different providers may provide different types of information or use different formats. In some embodiments, this position information is communicated to location monitoring resource allocation program 110 and processed as discussed further below.

Indoor location providers 104 include any system, service, device, network, or other component that provides indoor region position information to location monitoring resource allocation program 110. In particular, the indoor location provider 104 provides position information regarding the position of a mobile device with respect to positions of indoor regions. Some embodiments include one or more indoor location providers 104. The indoor position information 124 may be provided from one or more indoor location providers 104 to a position layer 120 of location monitoring resource allocation program 110. Indoor location providers 104 may utilize location-providing technology that relates to indoor regions. Examples of location providing technology that can be used by indoor location providers 104 include, but are not limited to, Bluetooth®, Bluetooth® Low Energy ("BLE"), Wi-Fi, near-field communication ("NFC"), and ZigBee®. Indoor location providers 104 may be associated with one or more indoor regions and may utilize one or more location-sensing systems that are specific to indoor regions. One or more portions of the position information calculated by indoor location providers 104 may be similar to the type of position information provided by outdoor location providers 102. For example, indoor location providers may estimate latitude and longitude or provide other types of information that is globally relevant. In addition to or in place of such information, indoor information providers 104 may provide information specific to the particular venue or region with which they are associated. For example, an indoor location provider 104 associated with a grocery store may determine that the mobile device is located on a particular aisle of the store. Such information may be used to trigger one or more events on the mobile device that are related to the venue or the particular portion of the venue.

Identification of certain location providers as "indoor" location providers is for convenience purposes only, and such providers may include systems or components that are not physically located inside, and associated venues may include one or more areas that are not inside so long as the indoor location providers are associated with indoor regions. For example, a park, theater, golf course, or other venue may include one or more areas that are not contained within buildings but that still provide information relative to indoor regions and may still be considered an "indoor" location provider as used herein. Furthermore, some technologies may facilitate both outdoor and indoor location detection. For example, an outdoor location provider 102 may utilize the mobile device's detection of nearby Wi-Fi hotspots in conjunction with a database of known Wi-Fi hotspots to determine the device's position. An indoor location provider 104 may also utilize knowledge of Wi-Fi hotspot locations within a venue to determine the mobile device's position within the venue. Embodiments of the present disclosure may use any combination of location providers, outdoor or indoor, and those providers may use any suitable technology to facilitate location-detection.

Location monitoring resource allocation program 110 is a computer program that is operable to allocate location monitoring resources based on the position of the mobile device with respect to outdoor regions that are stored on the mobile device. The position of the mobile device with respect to outdoor regions that are stored on the mobile device may be assessed automatically. In examples, the position of the mobile device may be assessed on a periodic basis (e.g., every second, 10 seconds, 30 seconds, 1 minute, 5 minutes, or 10 minutes). In some examples, the position of the mobile device may be assessed in response to a request from a user. In particular, a request from a user to assess a position of the mobile device may be received at the mobile device. In examples, the position of the mobile device may be assessed when an indication is received that the mobile device is within a threshold distance from a boundary of an outdoor region. In some examples, the mobile device may be within the outdoor region when the indication is received. In this way, the indication may prompt the mobile device to assess the position of the mobile device when the mobile device is within a threshold distance of leaving the outdoor region. In particular, the indication may prompt the mobile device to assess the position of the mobile device as the mobile device is coming within a threshold distance of leaving the outdoor region. In some examples, the mobile device may be outside the outdoor region when the indication is received. In this way, the indication may prompt the mobile device to assess the position of the mobile device when the mobile device is within a threshold distance of entering the outdoor region. In particular, the indication may prompt the mobile device to assess the position of the mobile device as the mobile device is coming within a threshold distance of entering the outdoor region.

Figure 4:
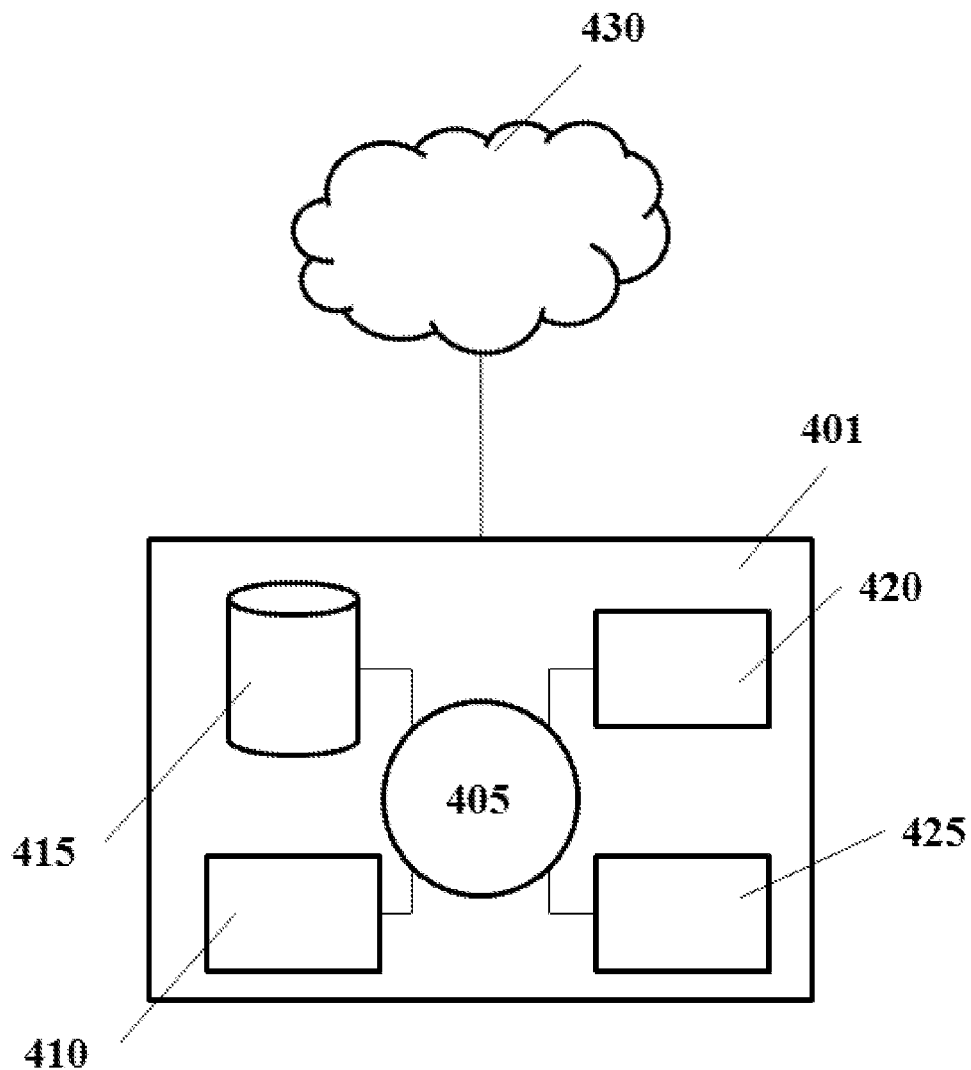
FIG. 4 shows a computer control system that is programmed or otherwise configured to implement methods provided herein.

In some embodiments, one or more portions of location monitoring resource allocation program 110 are run (or executed) on a mobile device (such as, for example, computer system 401 of FIG. 4). Location monitoring resource allocation program 110 is shown separately from such devices for convenience purposes only. One or more portions of location monitoring resource allocation program 110 may be an application, service, operating system component, or any other type of computer program.

In operation, location monitoring resource allocation program 110 may utilize the position information provided by outdoor location providers 102 or indoor location providers 104 to determine the location of the mobile device. In particular, this position information is used to allocate location monitor resources of the mobile device. For example, based on the normalized position information, location monitoring resource allocation program 110 may determine that the mobile device is outside each outdoor region that is stored within the mobile device. This determination, in turn, may lead the mobile device to allocate its location monitoring resources in a first mode that gives preference to monitoring outdoor regions, such as geo-regions and aggregated beacon regions. This first mode may be referred to as an "outdoor mode." In some examples, a mobile device may give a preference to monitor outdoor regions by only monitoring outdoor regions. In some examples, a mobile device may give a preference to monitor outdoor regions by monitoring more outdoor regions than indoor regions. In some examples, a mobile device may give a preference to monitor outdoor regions by monitoring one or more outdoor regions continually while monitoring indoor regions on a less frequent basis than monitoring the one or more outdoor regions.

When a mobile device is in outdoor mode, an application on the mobile device may create a list of regions that are monitored by resources of the mobile device. As discussed above, the maximum number of regions that are monitored may be capped by the operating system (OS) of the mobile device. Accordingly, the application may update the list of regions that are being monitored when the location of the mobile device changes. In particular, when the mobile device is in outdoor mode, the application may calculate the distances from the device's current location to all of the outdoor regions within an area of interest. The application may then add the nearest outdoor region to the list of regions that are being monitored. In particular, the application may add the nearest geo-region and may additionally add aggregated beacons in accordance with embodiments discussed below. Next, the application may add the next-nearest outdoor region to the list of regions that are being monitored. The application may continue to add outdoor regions until the list of regions to be monitored hits its maximum number, M.

In accordance with another embodiment, the application that is adding outdoor regions may have a preference for adding geo-regions over adding aggregated beacon regions. In this embodiment, the preference given to geo-regions may be based on an attempt to maximize a total number of geo-regions that are monitored when the mobile device is in the outdoor mode. In one example, the mobile device may have a rule to monitor at least the nearest three geo-regions. Additionally, in a given example, each of the geo-regions may contain the same number of beacon regions and, further, the maximum number "M" of the OS system may be 20. In this example, the maximum number of beacon regions that could be monitored under the given restrictions can be the maximum number of regions that could be monitored (20) minus the number of geo-regions that are being monitored (3), so the maximum number of beacon regions that could be monitored can be 17 (i.e., 20–3). However, if an additional limitation was added such that no single geo-region may have more beacon regions monitored than any other geo-region, then the total number of beacon regions that can be monitored may be, for example, five per geo-region since five is the highest integer that is divisible into 17 without a remainder. These embodiments are just examples of different ways of implementing the outdoor mode in mobile devices.

In another example of the operation of the location monitoring resource allocation program 110, the position information provided by outdoor location providers 102 or indoor location providers 104 to determine the location of the mobile device may be used to determine that the mobile device is within a given outdoor region that is stored within the mobile device. This determination, in turn, may lead the mobile device to allocate its location monitoring resources in a second mode.

In an example, in the second mode, the mobile device may allocate location monitoring resources with a preference for monitoring the given outdoor region that mobile device is within and the indoor regions that are within the given outdoor region. A second mode may be referred to as an "Indoor Mode." Further, in some embodiments, while a mobile device is in indoor mode, it may not monitor aggregated beacon regions. Rather, in these embodiments, while a mobile device is in indoor mode, it may monitor the given outdoor region that mobile device is within and it may monitor as many indoor regions within the given outdoor region as possible.

In examples, as discussed further below, a mobile device may switch between an indoor mode and an outdoor mode. In additional examples, a mobile device may switch between an outdoor mode and an indoor mode. Additionally, if a mobile device transitions between a first outdoor region and a second outdoor region, the mobile device may stay in a second mode throughout the transition. However, while the mobile device is within the first outdoor region, the mobile device may be in an indoor mode that gives preference to monitor indoor regions within the first outdoor region. However, as the mobile device travels from the first outdoor region to the second outdoor region, the mobile device may be in an indoor mode that gives preference to monitor indoor regions within the second outdoor region. In this way, the mobile device may stay in a second, indoor mode, but may transition the given indoor regions to which the mobile device gives preference in monitoring.

Region information 126 includes any suitable information related to one or more outdoor or indoor regions. Region information 126 can include information about the location, size, or shape of a region, information about one or more venues associated with the region, relationship information about one or more related regions, or any other suitable information. For example, region information 126 may include information about one or more indoor location providers 104 operating in a venue within the region. Such information may allow the mobile device to anticipate, select, prioritize, or otherwise manage position detection while within the region. In some embodiments, region information 126 includes Geo-fence data. In operation, region information 126 may provide a mechanism for triggering a transition between outdoor mode and indoor mode (or vice versa), or it may provide an independent confirmation of a separate determination about entering or exiting a region that was made based on other information. In embodiments using the latter approach, region information 126 and information from outdoor or indoor location providers may be used to perform a multi-factor validation for transitions between regions. Additional factors may also be used to validate such transitions.

Metadata 128 may include any type of information that is related to location providers, regions, points of interest, or other types of information discussed herein. Metadata 128 may include tags or categories associated with such items. In some examples, tags or categories represent identifiers of hardware (e.g. BLE beacon identification), an indication whether the location is enabled/disabled, or groupings of locations (e.g. all locations with a pharmacy).

Location database 130 is operable to store information used by location monitoring resource allocation program 110. Such information includes, but is not limited to, configuration data 132, points of interest 134, region data 136, and stored regions 138. For example, configuration data 132 may provide one or more settings or other information used to configure location monitoring resource allocation program 110. Configuration data 132 may specify search radius for retrieving information, or configuration data 132 may specify how frequently to refresh caches of information that are used in making configurations. Points of interest 134 include information about one or more venues or other locations such as, for example, stores, restaurants, streets, buildings, or any other types of location. Region data 136 may include any type of information discussed above with respect to outdoor regions and indoor regions. Stored regions 138 may include any suitable type of information about how to allocate location monitoring resources based on the determined position of a mobile device and associated logic. Location database 130 may be stored locally on the mobile device, or one or more portions may be stored remotely (e.g., on a cloud server). In some embodiments, one or more portions of the information in location database 130 is synchronized with a remote server, such as location server 150. Such synchronization may be determined by the mobile device's current position (e.g., updating points of interest, zones, or routes that are close to the device's position), which may conserve device storage and bandwidth, though this is not required. Location database 130 may have any structure, configuration, or function described below with respect to electronic storage unit 415.

Figure 2:
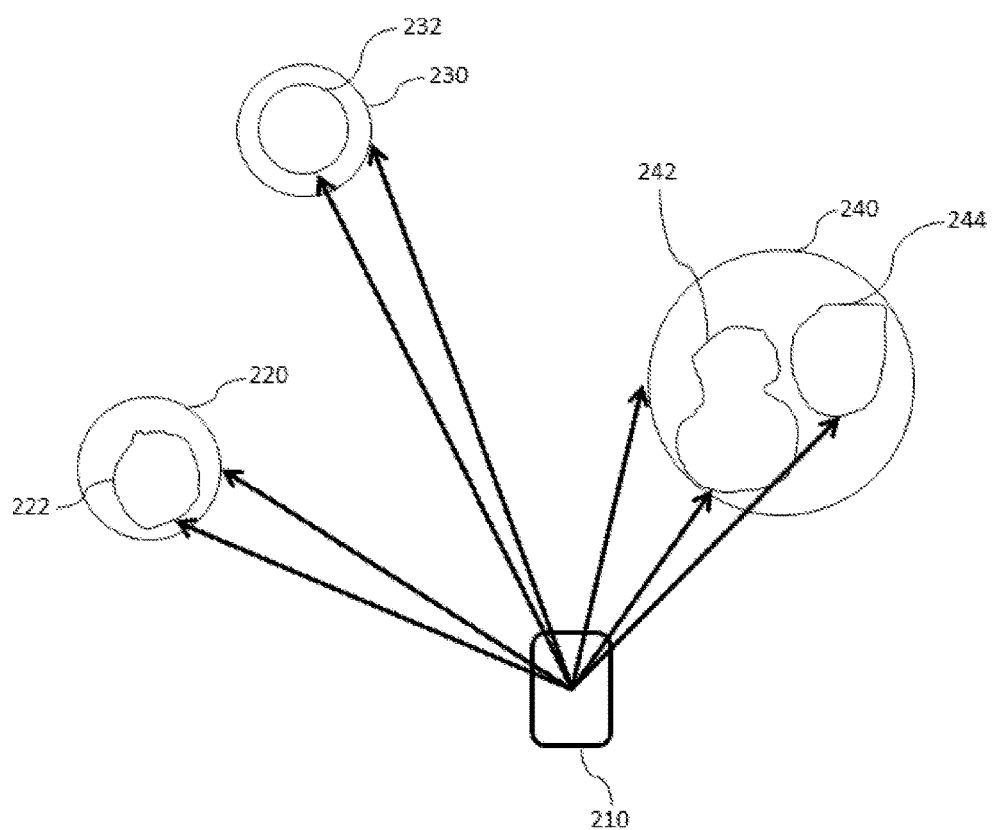
FIG. 2 illustrates an example of a mobile device in a position associated with allocating location monitoring resources in a first, outdoor mode, in accordance with some embodiments of the present disclosure.

FIG. 2 illustrates an example of a mobile device 210 in a position associated with allocating location monitoring resources in a first mode, in accordance with some embodiments of the present disclosure. As seen in FIG. 2, mobile device 210 is positioned outside outdoor regions 220-240. Further, outdoor regions 220 and 230 each include an indoor region 222 and 232, respectively, and outdoor region 240 includes indoor regions 242 and 244. When mobile device 210 is outside of each outdoor region 220-240, mobile device 210 operates in the first mode so as to give preference to the monitoring of outdoor regions 220-240 rather than indoor regions 222, 232, 242, and 244. In particular, in the first mode, mobile device 210 may allocate location monitoring resources with a preference for monitoring outdoor regions that are within a threshold distance of mobile device 210.

Figure 3:
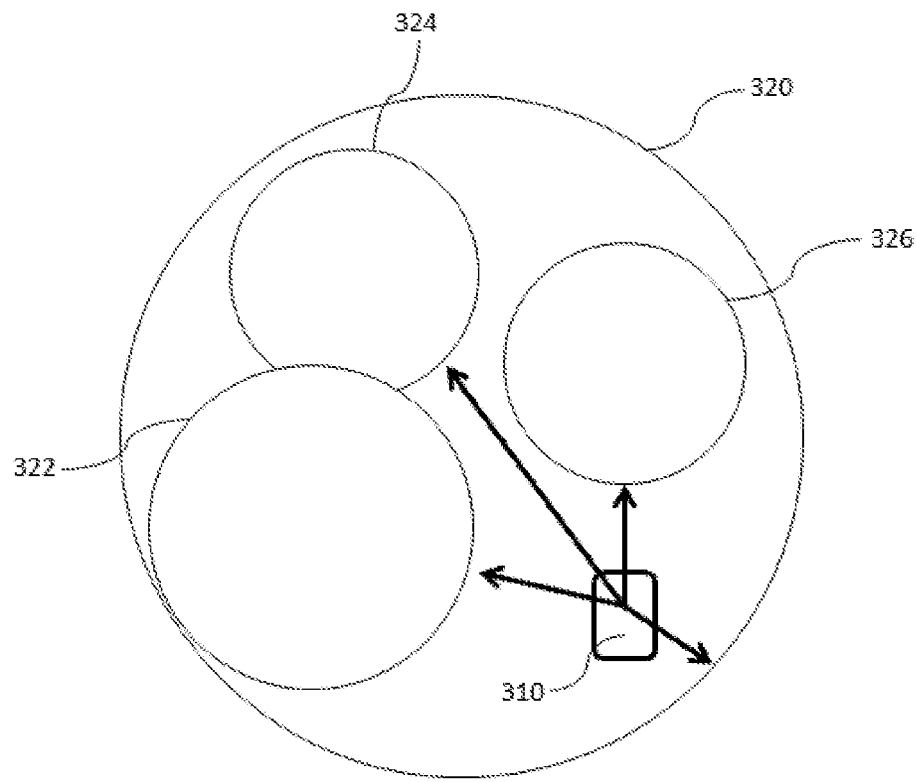
FIG. 3 illustrates an example of a mobile device in a position associated with allocating location monitoring resources in a second, indoor mode, in accordance with some embodiments of the present disclosure.

FIG. 3 illustrates an example of a mobile device 310 in a position associated with allocating location monitoring resources in a second mode, in accordance with some embodiments of the present disclosure. As seen in FIG. 3, mobile device 310 is positioned inside outdoor region 320. Further, outdoor region 320 includes indoor regions 322, 324, and 326. When mobile device 310 is inside an outdoor region, such as outdoor region 320, mobile device 310 operates in the second mode so as to give preference to the monitoring of outdoor region 320 as well as indoor regions 322, 324, and 326 rather than any other outdoor regions.

As discussed above, the total number of outdoor regions and indoor regions that are monitored by an application on a mobile device may not exceed M. Additionally, in indoor mode, the outdoor mode which the mobile device is within may be monitored. Accordingly, in some embodiments, the total number of indoor regions that may be monitored by the mobile device while it is in indoor mode is M−1, when the outdoor region is continually monitored.

In accordance with the descriptions above, a mobile device may be in a first, outdoor mode when it is outside of each outdoor region. Alternatively, a mobile device may be in a second, indoor mode when it is within an indoor region. However, a mobile device may not be simultaneously within an outdoor mode and an indoor mode.

In some embodiments, a mobile device may switch from an outdoor mode to an indoor mode. For example, the OS of a mobile device may notify an application on the mobile device that the mobile device has entered the nearest outdoor region. In response to the notification that the mobile device has entered an outdoor region, the application may switch to the indoor mode of allocating location monitoring resources. In another example, the application may switch from an outdoor mode to an indoor mode when the OS notifies the application that the mobile device has entered an outdoor region, even if the outdoor region is not the nearest outdoor region. This example may occur when an application is in outdoor mode, then loses all signals, and then regains signal at a point when the mobile device is in an outdoor region that is not the nearest outdoor region previously registered.

In some embodiments, a mobile device may switch from an indoor mode to an outdoor mode. In one example, an application on a mobile device may switch from an indoor mode to an outside mode when the OS of the mobile device notifies the application that the mobile device has exited an outdoor region. However, if the mobile device exits an outdoor region but stays within an indoor region, the application may stay in indoor mode. Alternatively, if the mobile device is disposed in each indoor region of the outdoor region, but stays within the outdoor region, the mobile device may also stay in indoor mode.

In another example, an application of a mobile device may switch from indoor mode to outdoor mode if the application receives a location update and finds that the mobile device is 1) outside all outdoor regions, and 2) is at least a threshold distance away from all outdoor regions, independent of whether the mobile device is still within an indoor region. In embodiments, the threshold distance may be 500 meters, but this distance may be tuned based on the application.

In a further example, a user may manually switch the mobile device from an outdoor mode to an indoor mode or vice versa.

Computer Control Systems

The present disclosure provides computer control systems that are programmed to implement methods of the disclosure. FIG. 4 shows a computer system 401 that is programmed or otherwise configured to allocate monitoring resources of a mobile device based on information received at the mobile device. The computer system 401 can regulate various aspects of allocating the monitoring resources as described in the present disclosure, such as, for example, determining the location of the mobile device, assessing the types of regions that are described with the various location providers, and allocating the monitoring resources of the mobile device based on the position of the mobile device. The computer system 401 can be an electronic device of a user or a computer system that is remotely located with respect to the electronic device. The electronic device can be a mobile electronic device.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., a mobile device). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 for displaying to the user, for example, the proximity of outdoor regions and indoor regions with respect to the position of the mobile device. The UI may display such information statically (e.g., a snapshot at a given point in time) or dynamically (e.g., updated on a periodic basis, such as every 1 second). Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, be utilized to determine the proximity of the mobile device to outdoor and indoor regions.

While preferred embodiments of the invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for allocating monitoring resources of a mobile device based on information received at the mobile device, comprising:
   (a) receiving, over a network, a plurality of outdoor regions and a plurality of indoor regions associated with a geographic area at the mobile device, wherein at least one indoor region of the plurality of indoor regions is not contained by at least one outdoor region of the plurality of outdoor regions;
   (b) determining, using a computer processor, whether the mobile device is outside of each of the plurality of outdoor regions and within the geographic area;
   (c) allocating the monitoring resources of the mobile device in a first mode when it is determined that the mobile device is outside each of the plurality of outdoor regions and within the geographic area, wherein the first mode of allocating the monitoring resources of the mobile device comprises monitoring a geographic location of the mobile device with respect to a list of outdoor regions selected from the plurality of outdoor regions;
   (d) allocating the monitoring resources of the mobile device in a second mode when it is determined that the mobile device is within a given outdoor region among the plurality of outdoor regions, wherein the given outdoor region has at least one indoor region among the plurality of indoor regions, wherein the second mode of allocating the monitoring resources of the mobile device comprises monitoring the geographic location of the mobile device in the given outdoor region with respect to the at least one indoor region; and
   (e) re-allocating the monitoring resources of the mobile device, while remaining in the second mode, to give preference to monitor more indoor regions than outdoor regions, wherein an initial allocation of monitoring resources in the second mode is distinct from a re-allocation of monitoring resources in the second mode.

2. The computer-implemented method of claim 1, wherein allocating the monitoring resources of the mobile device in the first mode further comprises:
   calculating a distance of the mobile device to each of the plurality of outdoor regions;
   identifying a subset of the plurality of outdoor regions within a threshold distance of the mobile device; and allocating the monitoring resources of the mobile device to monitor the subset of the plurality of outdoor regions identified within the threshold distance of the mobile device.

3. The computer-implemented method of claim 1, wherein allocating the monitoring resources of the mobile device in the second mode further comprises: monitoring the geographic location of the mobile device with respect to the given outdoor region.

4. The computer-implemented method of claim 3, further comprising:
determining that the mobile device has left the given outdoor region; and
assessing whether the mobile device is outside each of the plurality of outdoor regions after determining that the mobile device has left the given outdoor region.

5. The computer-implemented method of claim 4, further comprising:
re-allocating the monitoring resources of the mobile device in the first mode when it is determined that the mobile device is outside each of the plurality of outdoor regions.

6. The computer-implemented method of claim 4, further comprising:
re-allocating the monitoring resources of the mobile device in the second mode when it is determined that the mobile device is within a second outdoor region that is distinct from the given outdoor region.

7. The computer-implemented method of claim 6, wherein re-allocating the monitoring resources of the mobile device in the second mode comprises allocating monitoring resources to at least one indoor region that is associated with the second outdoor region.

8. The computer-implemented method of claim 1, wherein allocating the monitoring resources of the mobile device in the first mode allocates monitoring resources differently than allocating the monitoring resources of the mobile device in the second mode.

9. The computer-implemented method of claim 1, further comprising presenting the geographic location of the mobile device on a graphical user interface of an electronic display of the mobile device.

10. The computer-implemented method of claim 1, wherein the mobile device is associated with a region selected from the group consisting of a region that is outside each of a plurality of outdoor regions; an outdoor region; and an indoor region.

11. A computer-implemented method for switching between a first mode of allocating monitoring resources of a mobile device and a second mode of allocating monitoring resources of the mobile device based on information received at the mobile device, comprising:
(a) receiving, over a network, a plurality of outdoor regions and a plurality of indoor regions associated with a geographic area at the mobile device, wherein at least one indoor region of the plurality of indoor regions is not contained by at least one outdoor region of the plurality of outdoor regions;
(b) determining, using a computer processor, a proximity of the mobile device to each outdoor region of the plurality of outdoor regions;
(c) based on the proximity determined in (b), determining that the mobile device is outside each of the plurality of outdoor regions and within the geographic area;
(d) allocating the monitoring resources of the mobile device in the first mode based on the determination that the mobile device is outside each of the plurality of outdoor regions and within the geographic area, wherein the first mode of allocating the monitoring resources of the mobile device comprises monitoring a geographic location of the mobile device with respect to a list of outdoor regions selected from the plurality of outdoor regions;
(e) reassessing the proximity of the mobile device to each outdoor region of the plurality of outdoor regions;
(f) determining that the mobile device is within a given outdoor region of the plurality of outdoor regions;
(g) allocating the monitoring resources of the mobile device in the second mode based on the determination that the mobile device is within the given outdoor region of the plurality of outdoor regions, wherein the given outdoor region has at least one indoor region among the plurality of indoor regions, wherein the second mode of allocating the monitoring resources of the mobile device comprises monitoring the geographic location of the mobile device in the given outdoor region with respect to the at least one indoor region; and
(h) re-allocating the monitoring resources of the mobile device, while remaining in the second mode, to give preference to monitor more indoor regions than outdoor regions, wherein an initial allocation of monitoring resources in the second mode is distinct from a re-allocation of monitoring resources in the second mode.

12. The computer-implemented method of claim 11, wherein the reassessing the proximity of the mobile device to each outdoor region of the plurality of outdoor regions is initiated based on an indication received at the mobile device that the mobile device has entered an outdoor region.

13. The computer-implemented method of claim 11, wherein the proximity of the mobile device to each outdoor region of the plurality of outdoor regions is reassessed on a periodic basis.

14. The computer-implemented method of claim 11, wherein the proximity of the mobile device to each outdoor region of the plurality of outdoor regions is automatically reassessed after a predetermined amount of time has passed.

15. The computer-implemented method of claim 11, wherein assessing the proximity of the mobile device to each outdoor region of the plurality of outdoor regions comprises assessing an orientation of the mobile device with respect to each outdoor region of the plurality of outdoor regions.

16. The computer-implemented method of claim 11, wherein assessing the proximity of the mobile device to each outdoor region of the plurality of outdoor regions comprises assessing a speed or velocity of the mobile device travelling with respect to each outdoor region of the plurality of outdoor regions.

17. The computer-implemented method of claim 11, wherein the proximity of the mobile device to each outdoor region of the plurality of outdoor regions is assessed in response to receiving a user request.

18. The computer-implemented method of claim 11, wherein the proximity of the mobile device to each outdoor region of the plurality of outdoor regions is reassessed when the mobile device is at or within a predetermined distance of a boundary of an individual outdoor region.

19. The computer-implemented method of claim 18, wherein a location of the mobile device with respect to the boundary of the individual outdoor region is determined based on an assessed orientation of the mobile device.

20. The computer-implemented method of claim 18, wherein a location of the mobile device with respect to the boundary of the individual outdoor region is determined based on an assessed speed or velocity of the mobile device.

21. The computer-implemented method of claim 11, further comprising presenting the geographic location of the mobile device on a graphical user interface of an electronic display of the mobile device.

22. The computer-implemented method of claim 11, wherein the mobile device is associated with a region selected from the group consisting of a region that is outside each of a plurality of outdoor regions; an outdoor region; and an indoor region.

* * * * *